United States Patent
Olivereau et al.

(10) Patent No.: US 7,564,825 B2
(45) Date of Patent: Jul. 21, 2009

(54) METHOD OF VALIDATED COMMUNICATION

(75) Inventors: Alexis Olivereau, Orsay (FR); Christophe Janneteau, Chaudon (FR); Alexandru Petrescu, Orsay (FR)

(73) Assignee: Motorola, Inc., Schaumburg, IL (US)

( * ) Notice: Subject to any disclaimer, the term of this patent is extended or adjusted under 35 U.S.C. 154(b) by 613 days.

(21) Appl. No.: 11/338,189

(22) Filed: Jan. 24, 2006

(65) Prior Publication Data

US 2006/0120315 A1   Jun. 8, 2006

(51) Int. Cl.
*H04Q 7/24* (2006.01)
(52) U.S. Cl. .................. 370/338; 370/313; 370/351; 370/382; 370/389; 370/401; 455/436; 380/247; 380/248; 380/249; 380/250; 380/270; 709/238; 709/239; 709/245
(58) Field of Classification Search .............. 455/436; 370/237, 331, 338, 351, 352, 313, 389, 400, 370/401, 442; 709/238, 239, 223, 227, 245; 726/6; 380/247–250, 270, 277–285
See application file for complete search history.

(56) References Cited

U.S. PATENT DOCUMENTS

| 6,987,771 | B2 * | 1/2006 | Shimizu et al. | 370/401 |
| 7,116,654 | B2 * | 10/2006 | Kim | 370/338 |
| 7,353,027 | B2 * | 4/2008 | Karagiannis et al. | 455/436 |
| 7,409,549 | B1 * | 8/2008 | Leung et al. | 713/168 |
| 2002/0080752 | A1 * | 6/2002 | Johansson et al. | 370/338 |
| 2003/0095523 | A1 | 5/2003 | Korus et al. | |
| 2004/0057384 | A1 * | 3/2004 | Le et al. | 370/252 |
| 2004/0095913 | A1 * | 5/2004 | Westphal | 370/338 |
| 2004/0236937 | A1 * | 11/2004 | Perkins et al. | 713/150 |
| 2004/0246933 | A1 * | 12/2004 | Valko et al. | 370/338 |

FOREIGN PATENT DOCUMENTS

| EP | 1 158 742 | 11/2001 |
| WO | WO 03/047183 | 6/2003 |

OTHER PUBLICATIONS

Charles E. Perkins and David B. Johnson, Route Optimization for Mobile IP, Jun. 1998, Cluster Computing, vol. 1, No. 2, pp. 161-176.*

* cited by examiner

*Primary Examiner*—Charles N Appiah
*Assistant Examiner*—Olumide T Ajibade Akonai (57) ABSTRACT

A method of validated communication The present invention provides a method of validated communication between a mobile network node (MNN) and a correspondent node (CN) via at least a first mobile router (MR). The method is characterized by employing an extended return routability checking procedure (XRRP) wherein an MNN test initiation (MNNTI) message is sent by the MR, and a MNN test (MNNT) message is sent by the CN. This adds to the security of requiring the home and care-of addresses being consistent as noted previously in standard RRPs, by enabling the generation of binding update validation keys based on receipt on any or all of the three HoT, CoT and MNNT test messages. The method is further characterized by sending from the MR an extended binding update (XBU), comprising the MNN's address (MNNA). By extending the binding update to include the MNNA in this manner, validated CN/MNN route optimization can be achieved.

20 Claims, 6 Drawing Sheets

METHOD OF VALIDATED COMMUNICATION

TECHNICAL FIELD

The invention relates to a method of validated communication, in particular, it relates to a method of validated communication between a mobile network node and a correspondent node via at least a first mobile router.

BACKGROUND

Traditional mobility support aims to provide continuous Internet connectivity to mobile hosts, such as for example a laptop computer with wireless connectivity. By contrast, network mobility support is concerned with situations where an entire network comprising potentially many hosts changes its point of attachment to the Internet topology and thus the route to reach it in the topology. Such a network in movement can be called a Mobile Network.

A number of scenarios exist where such Mobile Networks occur. To give just two examples:

i. A Personal Area Network (PAN, i.e. a network of several personal devices attached to an individual) will change its point of attachment to the Internet topology whilst the user is walking around town.

ii. A network embedded in a bus or aircraft providing on-board Internet access to passengers. These passengers may be using a single device (e.g. a laptop) or in turn own a Mobile Network (such as a PAN), which then illustrates the case of a Mobile Network visiting a Mobile Network (i.e. nested mobility).

A Mobile Network (MONET) can therefore be defined as a set of nodes, part of one or more IP-subnets attached to a Mobile Router (MR), that are mobile as a unit, with respect to the rest of the Internet. In other words, an MR and all its attached nodes (so called Mobile Network Nodes or MNNs).

An MNN itself may be a local fixed node (LFN) permanently associated with a given mobile network, a local mobile node (LMN) capable of altering its point of network attachment within the current mobile network and of leaving the current mobile network to attach elsewhere, or a visiting mobile node (VMN), whose home link is not on the current mobile network and has changed its point of attachment from somewhere outside the current mobile network. As noted above, the MNN can be a simple mobile host or another mobile router, resulting in nested mobility.

With the change of attachment points available to mobile networks, a method of optimising the route by which packets of data are sent and received by such networks is highly desirable for a number of reasons:

i. Route optimisation reduces delay by reducing packet path length;

ii. It increases overall available bandwidth in the system because packets are routed through a shorter path, and are no longer tunnelled;

iii. It can increase the maximum transmission unit size on the communication path, reducing fragmentation of the payload.

The Mobility Support in the IPv6 ('mobile IPv6' or MIPv6) specification (see http://www.ietf.org/) proposes means to enable Route Optimisation (bi-directional communication using the shortest path) between an MN and a correspondent node (CN), but no mechanism has been proposed as yet to enable route optimisation between an MNN and a CN.

Figure 1:
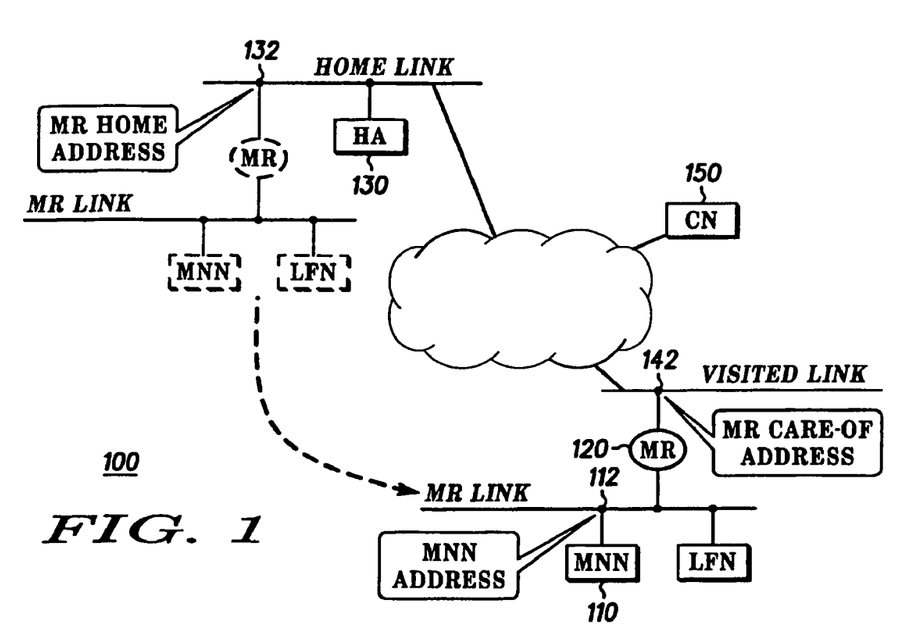
FIG. 1 is a schematic diagram of communication between a correspondent node and a mobile network node.

Referring to FIG. 1, the basic network mobility support ("NEMO Basic Support Protocol" at http://www.ietf.org/) for communication between an MNN and a CN relies on bi-directional tunnelling between the mobile router (MR) and its home agent (HA):

i. Inbound packets (from a CN to a MNN) are sent to the MR's home link; The MR's HA intercepts and tunnels them to the MR.

ii. Outbound packets (from an MNN to a CN) are reverse-tunnelled by the MR to its HA.

However, this does not provide route optimisation to the MNN.

EP 1 158 742 A1 and associated paper, "Mobile Networks Support in Mobile IPv6 (Prefix Scope Binding Updates)", by T. Ernst, A. Olivereau, L. Bellier, C. Castelluccia, H. -Y. Lach, IETF Internet-Draft draft-ernst-mobileip-v6-network-03.txt, March 2002, describe how when an MR roams to a visited network, it sends a modified version of the MIPv6 binding update (BU), referred to by these documents as a prefix scope binding update (PSBU), to its home agent (HA).

The classical MIPv6 BU only informs the CN of where to send data addressed to a single mobile node (e.g. the mobile routers home address (HoA) coupled to a roving care-of address (CoA)). The proposed PSBU does not bind an MR HoA to an MR CoA but the MR prefix to the MR CoA, thus informing the HA receiving the PSBU to send data addressed to any MNN attached to the MR on to the MR CoA.

Upon reception of a packet whose destination address matches with the MR prefix (e.g. the destination is an MNN), the Home Agent (HA) must then tunnel the packet to the MR CoA that will deliver it to the actual recipient.

Similarly the MR may send PSBUs to the correspondent nodes of the MNNs, which would achieve CN/MNN route optimisation.

However, this solution is only acceptable if the PSBU can be successfully validated by its recipient. Beyond peer authentication, the PSBU sender has to actually prove that it owns the whole prefix that it sends a PSBU for.

This is not a problem as long as the recipient of the PSBU is the MR Home Agent, which is expected to have initial knowledge about the prefix that belongs to the MR. However when the recipient is any CN, a mechanism has to be found to allow that CN to validate a PSBU. No mechanism has been proposed as yet, which greatly reduces the applicability of this solution.

One may consider the applicability of the methods already proposed for classic MIPv6 BU validation:

i. Cryptographically Generated Addresses.

In this solution, a home address (HoA) is bound to a public key that is part of a public/private key pair. This ensures that a malicious node cannot assume the mantle of the home address, as it does not own the corresponding private key.

In reference to PSBU, however, this method cannot be extended to prefix ownership as a large number of home addresses may share the same prefix. Moreover it is unlikely that MIPv6 or any future specification is going to allow any mobile network to assign its own address or prefix. Adding an additional hash to the prefix in order to make the ownership unique, is limited by the available number of bits in the network prefix. Estimates suggest that only $2^{16}$ (approximately 65,000) public keys would need to be tested by an attacker to achieve a 50% chance of losing uniqueness and thus security.

ii. Return Routability Checking Procedure (RRP). RRPs are now incorporated within the MIPv6 specification, and consist of a check by the correspondent node (CN) to verify that the specified home address (HoA) can actually be reached at the specified care-of address (CoA), before accepting the binding update (BU). Essentially, the process comprises:

A mobile node (MN) initiating the procedure by sending Home Test Initiation (HoTI) and Care-of Test Initiation (COTI) messages to the CN;

The CN sending a Home Test (HoT) message to the home address of the MN and a Care-of Test (CoT) message to the care-of address of the MN;

From the contents of both the HoT and the CoT, The MN generates a key that it uses to sign the BU it is to send.

The MN thus needs to successfully receive both the HoT and the CoT to be able to generate a valid BU. This is considered by the CN as a sufficient proof that the home and care-of addresses are valid for that MN.

In reference to PSBU, however, this mechanism cannot be used to ensure that a whole prefix can be reached at a certain care-of address. Prefix ownership is much more than address ownership: to obtain a similar level of security, it would be necessary for the CN to check using RRP all possible addresses that can be derived from that network prefix.

This is clearly unacceptable, as standard prefix lengths lead to an enormous quantity of possible IPv6 addresses.

Consequently one concludes that PSBU cannot provide validated route optimisation to the mobile network, i.e. it cannot provide validated route optimisation to any mobile network node attached therein.

Thus a need still exists for a method of validated route optimisation for mobile network nodes.

The purpose of the present invention is to address the above need.

SUMMARY OF THE INVENTION

The present invention provides a method of validated communication between a mobile network node (MNN) and a correspondent node (CN) via at least a first mobile router (MR) as described in the accompanying claims.

In a first aspect, the present invention provides a method of validated communication, as claimed in claim 1.

In a second aspect, the present invention provides apparatus for validated communication, as claimed in claim 1.

In a third aspect, the present invention provides a mobile router operable to perform validated communication, as claimed in claim 1.

In a fourth aspect, the present invention provides a correspondent node operable to perform validated communication, as claimed in claim 1.

Further features of the present invention are as defined in the dependent claims.

Embodiments of the present invention will now be described by way of example with reference to the accompanying drawing(s), in which:

DETAILED DESCRIPTION

A method of validated communication is disclosed. In the following description, a number of specific details are presented in order to provide a thorough understanding of the present invention. It will be obvious, however, to a person skilled in the art that these specific details need not be employed to practice the present invention. In other instances, well known methods, procedures and components have not been described in detail in order to avoid unnecessarily obscuring the present invention.

Referring to FIG. 1, a method of validated communication is presented, between a mobile network node (MNN) 110 and a correspondent node (CN) 150 via at least a first mobile router (MR) 120.

FIG. 1 illustrates a mobile router (MR) 120 and its network that has moved from its home address 132 to an address 142 on a visited link, thus creating the need for a method of validated route optimisation for a mobile network node (MNN) (110).

Figure 2:
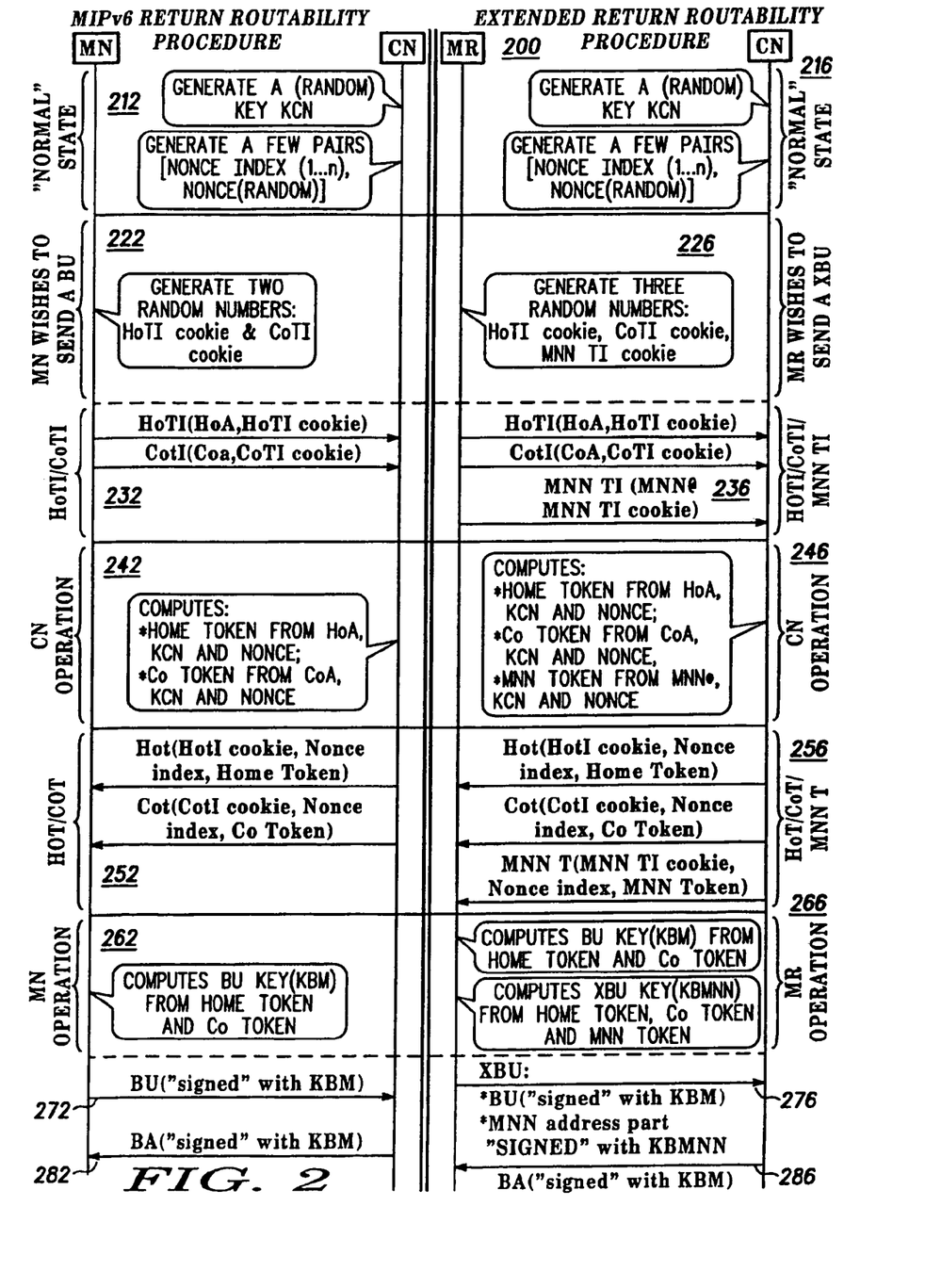
FIG. 2 is a comparative process chart detailing the differences between a return routability checking procedure known to the art and an extended return routability checking procedure in accordance with an embodiment of the present invention.

Now also referring to FIG. 2, in an embodiment of the present invention, the method employs an extended return routability checking procedure (XRRP) 200, wherein an MNN test initiation (MNNTI) message is sent 236 by the MR 120, and wherein a MNN test (MNNT) message is sent 256 by the CN 150.

This adds to the security of requiring the home and care-of addresses being consistent as noted previously in standard RRPs, by enabling the generation of binding update validation keys based on receipt on any or all of the three HoT, CoT and MNNT test messages.

Figure 3:
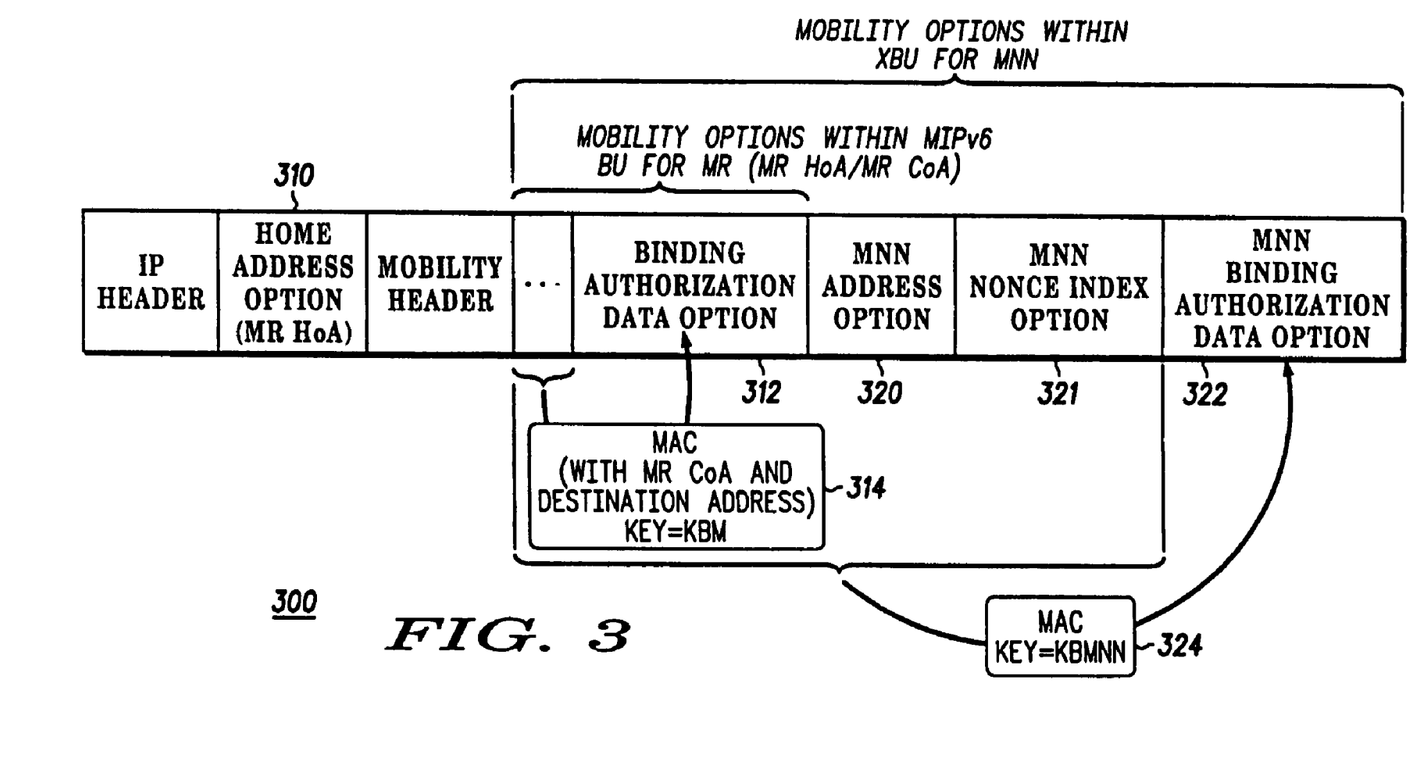
FIG. 3 is a block diagram of mobility options for an extended binding update message in accordance with an embodiment of the present invention.

Additionally referring to FIG. 3, the method of this embodiment of the invention also includes sending from the MR 120 an extended binding update (XBU) 300 comprising 320 the MNN's address (MNNA) 112.

By extending the binding update to include the MNNA in this manner, validated CN/MNN route optimisation can be achieved. In particular, the validated CN/MNN route optimisation can be achieved without the need for a pre-established security context.

Additionally, it provides a suitable level of security to mobile network route optimisation—in particular a malicious node should not be able to assume the mantle of an MNN's address and redirect data elsewhere, or assume the mantle of care-of address of an MR and launch denial of service attacks on it.

Moreover, it is transparent to the MNN, so that no changes are needed to the node and consequently current equipment can enjoy the benefits of the present invention.

The extended return routability checking procedure 200 is detailed as follows:

The MR 120 detects that route optimisation is not being used for the MNN 110 whenever it receives a tunnelled packet from its home agent for that MNN 110.

Thus the validation process 200 between the MR 120 and correspondent node CN 150 is initiated upon receipt by the MR 120 of a tunnelled packet from the home agent HA 130 of the MR 120 addressed to the mobile network node MNN 110.

However, this may be subject to at least one of the following set of conditions, namely that;

i. The MNN 110 subscribes to a specified service;
ii. The CN 150 has not ignored a threshold number of prior XBUs 300;
iii. The CN 150 has not ignored a threshold number of validation processes 200; and
iv. The MNN 110 satisfies a usage policy.

Upon initiation of a validation process 200, the MR 120 generates random values (hereinafter 'Cookies') for a home address test initiation (HoTI) message and a care-of address test initiation (CoTI) message, as known in the art.

In addition, however, it is now proposed that a further cookie is generated, for an additional mobile network node test initiation (MNNTI) message.

The inventors of the present invention have appreciated the need for an additional message to be employed due to the constraints of the current MIPv6 specification: The MR 120 is required to prove the correctness of the binding MR HoA 132/MR CoA 142, but in addition to that proof, a third check involving the MNN 110 is necessary for the desired level of validation. Thus essentially, either the MNN 110 must be able to attest that it trusts the MR 120 to route its packets, or the MR 120 must be able to prove that it is entitled to route the packets destined to the MNN 110.

In order to retain the advantage of being transparent to the MNN 110, the inventors of the present invention chose the second mechanism: the MR 120 is to prove, upon request of the CN 150, that it is actually serving the MNN 110. MIPv6 specifies that the proof of home address ownership be performed through HoTI (Home Test Init) and HoT (Home Test) messages respectively sent from MR HoA 132 to CN 150 and from CN 150 to MR HoA 132. Likewise, the proof of care-of address ownership is performed through COTI (Care-of Test Init) and CoT (Care-of Test) messages respectively sent from MR CoA 142 to CN 150 and from CN 150 to MR CoA 142.

Thus the validation process (200) comprises the step (236) of the MR 120 sending a HoTI comprising the MR home address (HoA) 132 and a HoTI cookie to the CN 150; and the MR 120 sending a COTI comprising the MR care-of address (CoA) 142 and a CoTI cookie to the CN 150 as known in the art, and additionally involves the MR 120 sending an MNNTI comprising the MNN address (MNNA) 112 and a MNNTI cookie to the CN 150.

The HoTI is sent via the MR home address (HoA) 132 and the COTI is sent via the MR care-of address (CoA) 142.

Unlike the HoTI and CoTI messages however, the MNNTI message comprises a mobility option (as defined in MIPv6) that in turn comprises MNN address 112.

In a preferred embodiment of the present invention, the MNNTI is sent via the MR HoA 132.

In an alternative embodiment of the present invention, the MNNTI is sent via the MR care-of address (CoA) 142. The MNNTI message then additionally comprises the MR home address (HoA) 132.

In an embodiment of the present invention, upon receipt of the relevant test initiation message, the CN 150 performs the step 246 of computing a home token from an HoA 132 extracted from a HoTI, together with a random key (KCN) and a nonce (a time-dependent value), and computing a care-of token from a CoA 142 extracted from a COTI, KCN and a nonce, as known in the art.

Additionally, upon receipt of an MNNTI, the CN 150 computes an MNN token from an MNNA 112 extracted from the MNNTI, together with KCN and a nonce.

Having generated tokens in response to the respective initialisation tests, the CN 150 performs the step 256 of sending a home address test (HoT) comprising a HoTI cookie, home nonce index and home token to the MR 120, and sending a care-of address test (CoT) comprising a CoTI cookie, care-of nonce index and care-of token to the MR 120, as known in the art. A nonce index allows the CN to retrieve the nonce used to generate a token, without sending the nonce itself as this would compromise security.

Additionally, the CN 150 sends a mobile network node address test (MNNT) comprising an MNNTI cookie, MNN nonce index and MNN token to the MNN 110, the MNNT further comprising;

a mobile router presence option (MRPO) that comprises the MR home address (HoA) 132.

The HoT is sent to the MR HoA 132, and the CoT is sent to the MR CoA 142. The MNNT is sent to the MNN address (MNNA) 112.

The intent is for the HoT and CoT to both reach the MR, and for the MNNT to reach the MNN.

Note that the MNN token will provide a more robust level of security within the validation process 200 if it remains confidential. To this end, a home agent (HA) 130 may encrypt an MNNT when tunnelling said MNNT to an MR 120 if the CN 150 does not encrypt it.

The mobile router presence option (MRPO) is an IP hop-by-hop option that instructs every router on the path to the recipient to examine it, although in practice only mobile routers will typically examine this option.

The inventors of the present invention have appreciated that this is necessary because the CN 150 addresses the MNNT to the MNN 110 to ensure it is routed to the correct place, but it is desired that the MR 120—if it is the valid MR in the correct place—is able to intercept the MNNT, in order to generate a validation key with it. This requires the facility for the MR 120 to be able to examine some characterising portion of the MNNT, such as an MR HoA 132 within the MRPO.

Consequently the MR 120 compares its own home address 132 to an MR home address that it extracts from MNNTs that it receives for routing to the MNN 110.

In an alternative embodiment, the MRPO carries an MR care-of address (CoA) rather than an MR HoA, and the MR compares its own CoA 142 to an MR CoA that it extracts from MNNTs that it receives for routing to the MNN 110.

In the case of either HoA or CoA above, if the addresses match, the MR 120 does not forward the MNNT further to the MNN. Instead, it verifies that the MNNTI cookie extracted from the MNNT matches that sent by the MR 120 in the MNNTI, and upon verification of a match, extracts the MNN nonce index and MNN token from the MNNT.

The cookie thus provides a failsafe against maliciously constructed MNNTs.

The MR 120 is now in a position to generate a valid XBU.

Referring to FIG. 3, the MR 120, having received the MNNT, HoT and CoT, now possesses a home token, care-of token and MNN token generated by the CN 150. The MR is then able to generate a binding update validation key (KBM) 314 from the home token and care-of token that the CN 150 will recognise as belonging to the valid MR 120, as known in the art.

In addition, the MR 120 is also able to generate 266 an extended binding update (XBU) validation key (KBMNN) 324 from the MNN token.

In an embodiment of the present invention, the XBU is structured with the intent of being interpreted as a standard BU if received by a CN 150 incapable of understanding the extension.

The XBU is thus obtained by adding new options to the MIPv6 BU. The extended binding update thus comprises at least the following two options:
i. MNN address 320; and
ii. XBU signature 322.

An optional, yet preferred additional option iii. is the MNN nonce index 321.

The MNN address option 320 comprises the address of the MNN 112 for which the XBU is sent, whilst the XBU signature option 322 is generated 276 preferably based on a Message Authentication Code (MAC) that uses the KBMNN key 324, performed over the whole of the XBU.

The MR then sends the XBU to its recipient, typically the CN 150.

By incorporating a KBMNN key 324 based on the MNN token from the CN 150 in the signature 322, the CN 150 can validate a KBMNN based signature 322 extracted from an XBU 300 received by the CN 150 from the MR 120.

In an embodiment of the present invention, once the CN 150 has received and successfully validated an XBU 300, the CN 150 adds two entries to its binding cache (BC) derived from the validated XBU 300;
i. MR HoA 132 is marked as reachable though the MR CoA 142, as known in the art; and
ii. additionally, MNNA 112 is marked as reachable through the MR HoA 132.

One may assume that the CN uses recursive parsing of its binding cache, as detailed in EP 02291331.3 (Motorola).

Thus when the CN parses its BC with the MNN address 112 as the point of entry, the MR HoA 132 is first returned; due to recursive parsing of the BC, the MR HoA 132 is then searched in the BC, returning the MR CoA 142.

In an alternative embodiment of the present invention, the two entries added to the binding cache of the CN 150 are;
i. MR HoA 132 marked as reachable though the MR CoA 142, as known in the art; and
ii. additionally, MNNA 112 marked as reachable through the MR CoA 142.

Thus when the CN parses its BC with the MNN address 112 as the point of entry, the MR CoA 142 is first returned.

Then, in either embodiment, the CN 150 can then construct a packet with a single IP header whose destination is the first intermediate address, e.g. the MR CoA 142, followed by a routing header comprising other intermediate addresses such as the MR HoA 132 and the MNNA 112, and followed finally by the payload.

More generally in the case of nested mobile routers, the CN 150 will route packets for the MNN 110 with an IP header destination of the top-level mobile router care-of address, and with a routing header comprising at least the care-of addresses of subsequent mobile routers and the MNNA 112, followed finally by the payload.

It should be noted that if the CN 150 needs to refresh an expired MNN BC entry that was created in its binding cache (BC) by an XBU 300, then the CN 150 has to send a modified version of classical MIPv6 Binding Request message. That extended binding request (XBR) is sent to the MR and comprises the address 112 of the MNN 110 for which it is issued. Note that for purposes such as expiry and refreshment of data in the BC, one may distinguish the MNN BC entry ("MNN address is reachable at MR HoA") from the MR BC entry ("MR HoA is reachable at MR CoA") although both are created when CN 150 receives a validated XBU 300: typically, these two entries should not have the same lifetime (the lifetime of MNN BC entry is much longer). To enable the CN 150 to make this distinction, the structure of the CN BC should be slightly modified (for example by adding a flag for each entry specifying whether it is a MNN entry or not).

In an embodiment of the present invention, for the situation where a mobile router visits a mobile router (nested mobility), then a mobile router, upon receiving a tunnelled packet from its home agent, sends an XBU to the source address of the inner packet for the destination address of the inner packet.

Figure 4:
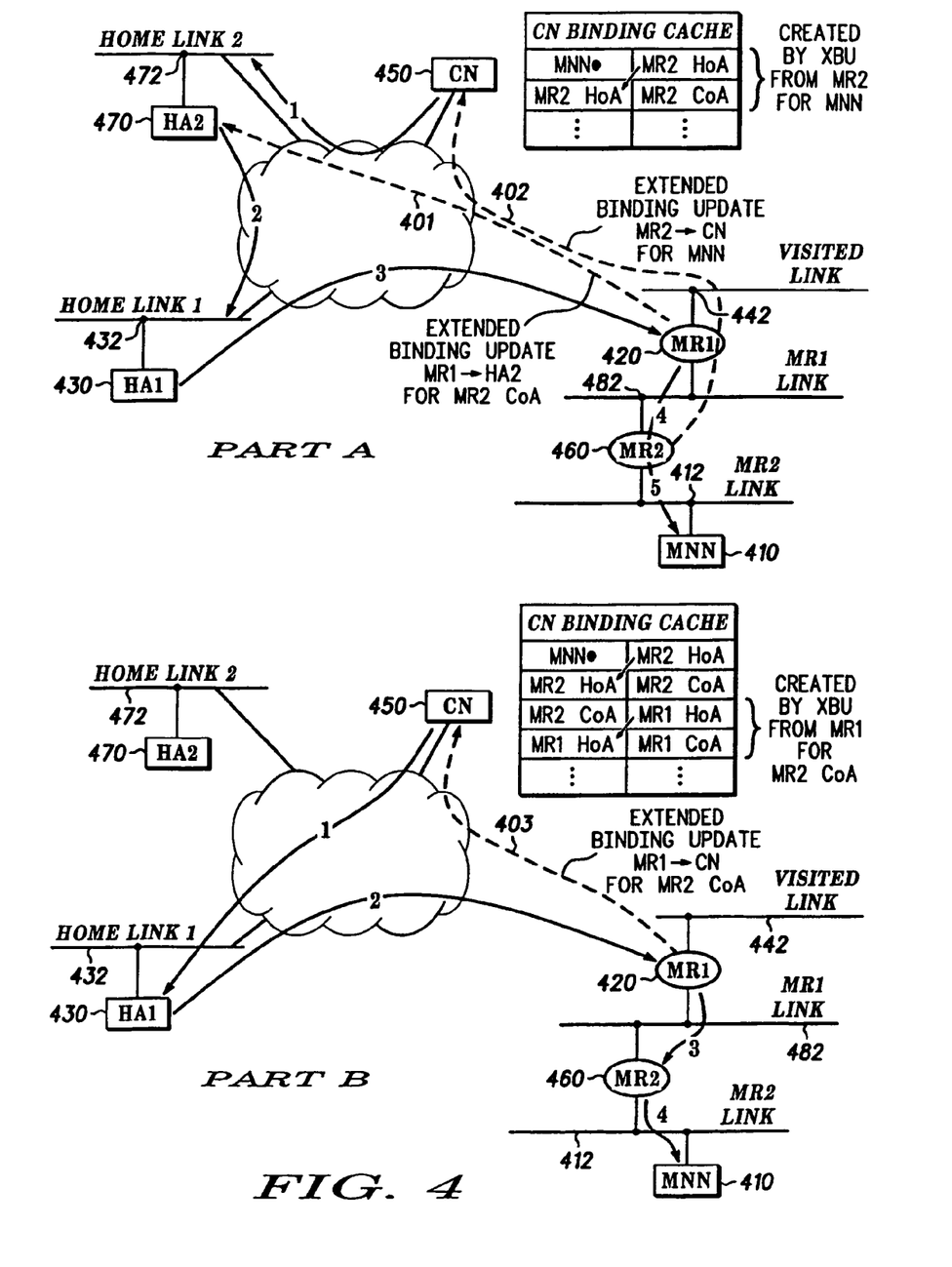
FIG. 4. is a schematic diagram of communication between a correspondent node and a mobile network node in accordance with an embodiment of the present invention.

Referring to parts 4A and 4B of FIG. 4, for the case of a first mobile router hosting a second mobile router:

A network of a first mobile router (MR1) 420 comprises a second mobile router (MR2) 460, and a network of MR2 460 comprises an MNN 410.

In order to compile a sequence of bindings in the CN binding cache that link the CN 150 to the MNN 110, the validation process 200 is instigated twice, first upon receipt of a first packet (FIG. 4A) by MR2 460 (tunnelled by MR2's HA 470), and second by receipt of a second packet (FIG. 4B) by MR1 420 (sent directly to the MR2 CoA 482 and tunnelled by MR1's HA 430). The encircled numbers in the FIGS. 4A and 4B show the respective routes of the two packets.

Referring to FIG. 4A, upon receiving a first tunnelled packet MR1 420 sends an XBU 401 to the MR2's home agent (HA2) 470 for MR2 CoA 482, since HA2 address and MR2 CoA are respectively in the source and destination fields of the inner packet. (The inner packet being defined as beginning with the next IP header in a series within the packet; referring to FIG. 5, packet 510 commences with IP header 501, and its inner packet, also shown separately as 520, commences with header 502);

HA2 470 will typically ignore XBU 401; its purpose is to 'unwrap' the inner packet in a manner consistent with the validation process.

MR1 420 forwards the inner packet to MR2 460; MR2 460, upon receiving the packet, detunnels a (second) inner packet and sends an XBU 402 to CN 450 for MNNA 412, since CN and MNN addresses are respectively in the source and destination fields of the inner packet; MR2 460 finally forwards the inner packet to MNN 110.

The result is that CN updates its binding cache to indirectly link the MNNA 112 with the MR2 CoA 482.

Referring to FIG. 4B, upon receiving a second tunnelled packed sent directly to MR2 CoA 482 with a routing header comprising the MR2 HoA 472 and MNNA 412, HA1 430 intercepts it and tunnels it to MR1 CoA 442.

Upon its receipt, MR1 420 sends an XBU 403 to CN 450 for MR2 CoA 482, since CN and MR2 Care-of addresses are respectively in the source and destination fields of the inner packet.

The result is that CN updates its binding cache to indirectly link the MR2 CoA 482 with the MR1 CoA 442.

Consequently, all the four entries thus generated in the CN BC, when parsed recursively, will route packets for the MNN 410 with an IP header destination of MR1 CoA 442, and with a routing header of {MR1 HoA 432, MR2 CoA 482, MR2 HoA 472, MNNA 412}.

It will be clear to a person skilled in the art that the above-described example is not limited to a single level of nesting of mobile networks.

In an enhanced embodiment of the present invention, for the situation where a mobile network visits a mobile network (nested mobility), there is an opportunity to avoid the sending of the first XBU 401 as described above. This has the added benefit that when n levels of mobile networks are nested, there is not a sequence of wasted XBUs. It also reduces the number of packets sent by the tunnelling method.

In this embodiment, a mobile router, upon receiving a tunnelled packet from its home agent, sends an XBU to the source address of the innermost packet for the destination address of the inner packet.

Figure 5:
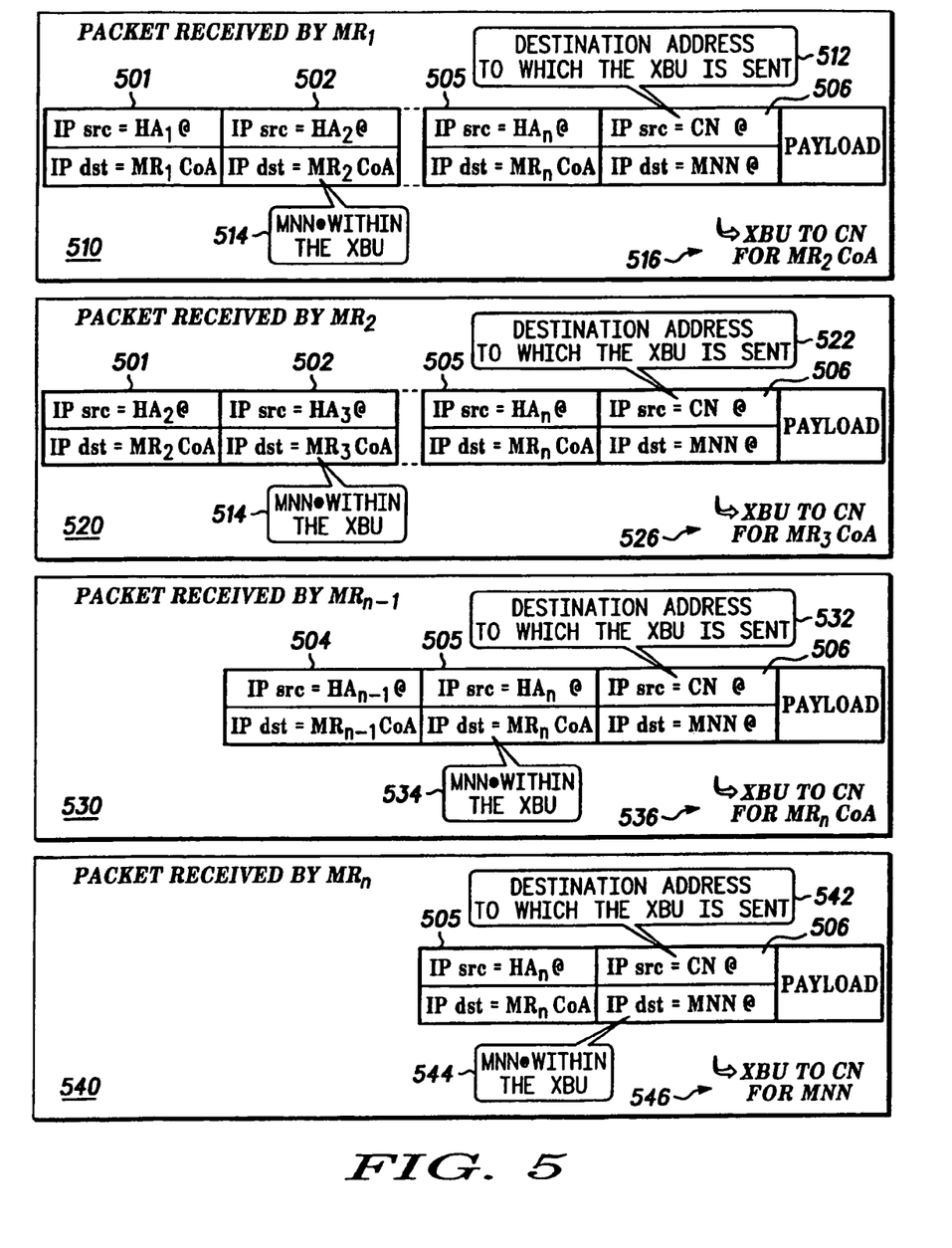
FIG. 5. is a block diagram detailing successive parsing of data packets in accordance with an embodiment of the present invention.
Figure 6:
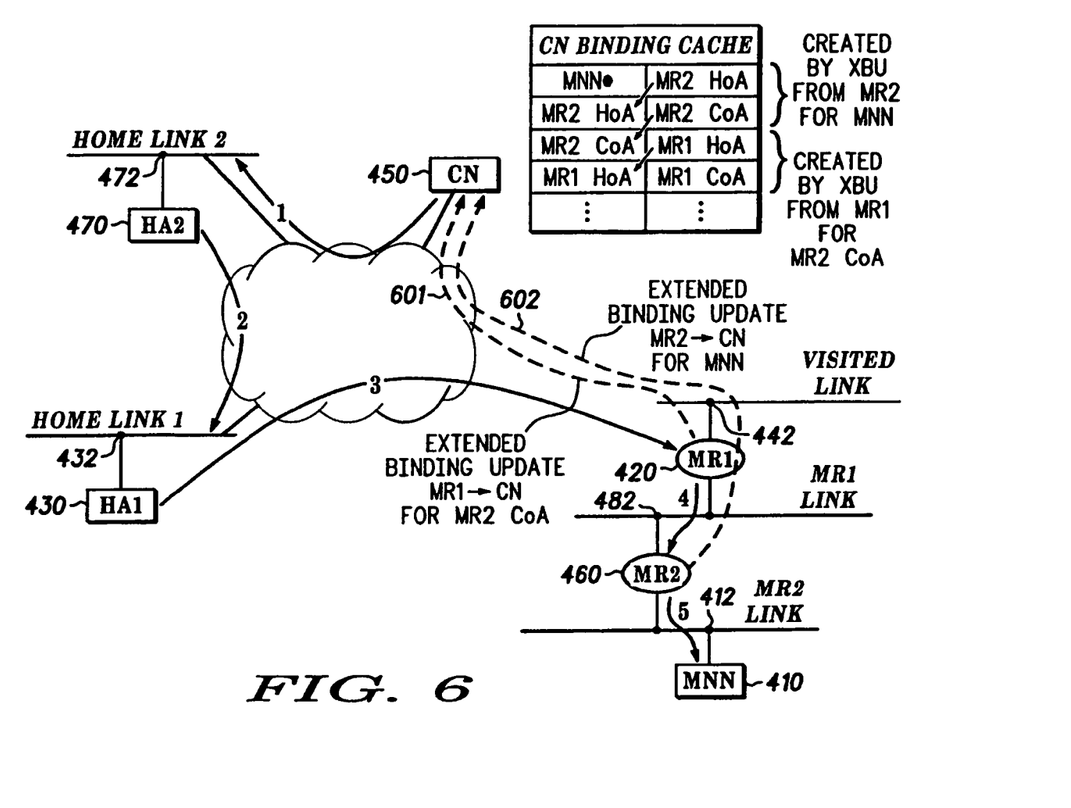
FIG. 6. is a schematic diagram of communication between a correspondent node and a mobile network node in accordance with an embodiment of the present invention.

Referring to FIGS. 5 and 6, tunnelled packet 510 depicts a payload prepended with IP headers for each step of the route to the MNN. For simplicity, each IP header in packet 510 can be considered the header of a packet that comprises any subsequent packets and thus also the payload. Thus in this case the first packet 501 is addressed to MR1 CoA 442, whilst the innermost packet 506 is addressed to MNNA 112.

Upon receiving a first tunnelled packet 510, MR1 420 sends an XBU 516 to the source address of the innermost packet (CN) 512 for destination 514 of the second (or 'inner') packet 502, namely MR2 CoA 482.

This has the effect of enabling the CN to update its binding cache (BC) to link the MR1 CoA 442 to the MR2 CoA 482.

Passing the packet on to MR2 460, MR2 460 receives second packet 520. By repeating the above process, MR2 460 sends an XBU 526 to the source address of the innermost packet (CN) 522 for destination 524; an MR3 CoA, should it exist.

The process repeats until and including MRn, to which the MNN 410 is attached, is reached, when MRn sends an XBU 556 to the source address of the innermost packet CN 552 for the MNN 410.

The 2n entries thus generated in the CN BC, when parsed recursively, will route packets for the MNN 510 with an IP header destination of MR1 CoA 542. Note that in FIG. 6 the contents of the BC have been re-ordered for clarity of presentation.

For the case of the architecture illustrated in FIG. 6 (which replicates that of FIGS. 4A and 4B), a network of a first mobile router (MR1) 420 comprises a second mobile router (MR2) 460, a network of MR2 460 comprising an MNN 410.

upon receiving a first tunnelled packet, MR1 420 sends an XBU 601 to the source address of the innermost packet (CN) for MR2 CoA 482;

MR1 passes the packet to MR2 460.

upon receiving that packet, MR2 460 sends an XBU 602 to the source address of the innermost packet (CN) for MNN, such that the four entries thus generated in the CN BC, when parsed recursively, will route packets for the MNN 410 with an IP header destination of MR1 CoA 442, and with a routing header of {MR1 HoA 432, MR2 CoA 482, MR2 HoA 472, MNNA 412}.

In an alternative embodiment of the present invention, a home address test initiation (HoTI) and mobile network node test initiation (MNNTI) may be combined, the resulting test initiation comprising a home/MNN TI cookie, MR HoA 132 and MNN address. It will be clear to a person skilled in the art that the processes described herein may readily be adapted to such a combined test initiation.

In a further alternative embodiment of the present invention, the MNNTI message is sent via the MR CoA 142.

In an alternative embodiment of the present invention, a care-of address test initiation (CoTI) and mobile network node test initiation (MNNTI) may be combined, the resulting test initiation comprising a care-of/MNN TI cookie, MR CoA 142 and MNN address. It will be clear to a person skilled in the art that the processes described herein may readily be adapted to such a combined test initiation.

In either of the above two alternative embodiments of the present invention, the MNNTI message sent via the MR CoA 142 may additionally comprise the MR HoA 132.

Apparatus for the role of correspondent node 150 may be any IP networkable appliance operable for use according to the methods described herein.

Apparatus for the role of mobile router 120 may be any IP networkable appliance capable of connecting a further IP networkable appliance operable for use according to the methods described herein.

The invention claimed is:

1. A method of validated communication between a mobile network node (MNN) (110) and a correspondent node (CN) (150) via a first mobile router (MR) (120), and characterised by the following steps;
    i. employing a validation process (200) wherein an MNN test initiation (MNNTI) message is sent by the MR (120), and a MNN test (MNNT) message is sent by the CN (150); and
    ii. sending from the MR (120) an extended binding update (XBU) comprising the MNN's address (MNNA) (112).

2. A method of validated communication according to claim 1, wherein
    upon receipt of a tunnelled packet from a home agent (HA) (130) of the mobile router (MR) (120) addressed to the mobile network node (MNN) (110), the MR (120) initiates a validation process (200) between the MR (120) and correspondent node (CN) (150).

3. A method of validated communication according to claim 1, wherein a validation process (200) between the mobile router (MR) (120) and correspondent node (CN) (150) comprises the step (226) of;
    the MR (120) generating random values ('cookies') for a home address test initiation (HoTI) message and a care-of address test initiation (CoTI) message, and is further characterised by;
    generating a cookie for the mobile network node test initiation (MNNTI) message.

4. A method of validated communication according to claim 1, wherein the validation process (200) between the mobile router (MR) (120) and correspondent node (CN) (150) comprises the step (236) of;
    the MR (120) sending a HoTI comprising an MR home address (HoA) (132) and a HoTI cookie to the CN (150); and
    the MR (120) sending a CoTI comprising an MR care-of address (CoA) (142) and a CoTI cookie to the CN (150), and is further characterised by;
    the MR (120) sending an MNNTI comprising the MNN address (MNNA) (112) and a MNNTI cookie to the CN (150).

5. A method of validated communication according to claim 4, wherein the HoTI is sent via the MR home address (HoA) (132), the CoTI is sent via the MR care-of address (CoA) (142) and the MNNTI is sent via either the HoA (132) or CoA (142).

6. A method of validated communication according to claim 5, wherein the MNNTI message additionally comprises the MR home address (HoA) (132).

7. A method of validated communication according claim 1, wherein the validation process (200) between the mobile router (MR) (120) and correspondent node (CN) (150) comprises the step (246) of;
    the CN (150) computing a home token from an HoA (132) extracted from a HoTI, a random key (KCN) and a nonce; and the CN (150) computing a care-of token from a CoA (142) extracted from a CoTI, the KCN and a nonce, and is further characterised by;

the CN (150) computing an MNN token from the MNNA (112) extracted from the MNNTI, the KCN and a nonce.

8. A method of validated communication according to claim 1, wherein the validation process (200) between the mobile router (MR) (120) and correspondent node (CN) (150) comprises the step (256) of;

the CN (150) sending a home address test (HoT) comprising a HoTI cookie, home nonce index and home token to the MR (120); and the CN (150) sending a care-of address test (CoT) comprising a CoTI cookie, care-of nonce index and care-of token to the MR (120), and is further characterised by;

the CN (150) sending the mobile network node address test (MNNT) comprising an MNNTI cookie, MNN nonce index and MNN token to the MNN (110), the MNNT further comprising;

a mobile router presence option (MRPO) that comprises an MR home address (HoA) (132).

9. A method of validated communication according to claim 1, wherein the validation process (200) between the mobile router (MR) (120) and correspondent node (CN) (150) comprises the step (256) of;

the CN (150) sending a home address test (HoT) comprising a HoTI cookie, home nonce index and home token to the MR (120); and the CN (150) sending a care-of address test (CoT) comprising a CoTI cookie, care-of nonce index and care-of token to the MR (120), and is further characterised by;

the CN (150) sending the mobile network node address test (MNNT) comprising an MNNTI cookie, MNN nonce index and MNN token to the MNN (110), the MNNT further comprising;

a mobile router presence option (MRPO) that comprises a care-of address (CoA) (142).

10. A method of validated communication according to claim 9, wherein the HoT is sent to the MR home address (HoA) (132), the CoT is sent to the MR care-of address (CoA) (142) and the MNNT is sent to the MNN address (MNNA) (112).

11. A method of validated communication according to claim 1, wherein the validation process (200) between the mobile router (MR) (120) and correspondent node (CN) (150) is characterised by the step of;

the MR (120) comparing its own home address (132) to any MR home address that the MR (120) can extract from MNNTs that it receives for routing to the MNN (110).

12. A method of validated communication according to claim 1, wherein the validation process (200) between the mobile router (MR) (120) and correspondent node (CN) (150) is characterised by the step of;

the MR (120) comparing its own care-of address (142) to any CoA that the MR (120) can extract from MNNTs that it receives for routing to the MNN (110).

13. A method of validated communication according to claim 12, wherein, the MR (120) does not forward the MNNT further;

verifies that an MNNTI cookie extracted from the MNNT matches that sent by the MR (120) in the MNNTI; and upon verification of a match, extracts the MNN nonce index and MNN token from the MNNT.

14. A method of validated communication according to claim 1, wherein the validation process (200) between the mobile router (MR) (120) and correspondent node (CN) (150) is characterised by the step (266) of;

the MR (120) generating an extended binding update (XBU) validation key (KBMNN) (324) from the MNN token.

15. A method of validated communication according to claim 1, wherein the validation process (200) between the mobile router (MR) (120) and correspondent node (CN) (150) is characterised by the step (276) of;

the MR (120) generating an extended binding update (XBU) signature (322) using a KBMNN key (324).

16. A method according to claim 15 wherein the signature is based upon a message authentication code using the KBMNN key (324).

17. A method of validated communication according to claim 15 wherein the extended binding update further comprises an MNN nonce index option (321).

18. A method of validated communication according to claim 15, wherein the extended binding update comprises one of the following:

i.. an MNN address (320); and ii. an XBU signature (322).

19. A method of validated communication according to claim 18, wherein a validation process (200) between the mobile router (MR) (120) and correspondent node (CN) (150) is characterised by the step of;

the CN (150) validating a KBMNN based signature (322) extracted from an XBU (300) received by the CN (150) from the MR (120).

20. A method of validated communication according to claim 1, wherein the validation process (200) between the mobile router (MR) (120) and correspondent node (CN) (150) is characterised by the step of;

a home agent (HA) (130) encrypting the MNNT when tunnelling said MNNT to an MR (120).

* * * * *